(12) United States Patent
Zhou et al.

(10) Patent No.: US 7,367,890 B2
(45) Date of Patent: May 6, 2008

(54) YOKE-TRUNNION UNIVERSAL JOINT WITHOUT NEEDLE BEARINGS

(75) Inventors: Jianqun Zhou, Hangzhou (CN); Guohui Sun, Hangzhou (CN); Jianzhi Ma, Hangzhou (CN); Hongzheng Shao, Hangzhou (CN); Jun Wu, Hangzhou (CN)

(73) Assignee: Wanxiang Qianchao Co., Ltd., Hangzhou, Zhejiang (CN)

( * ) Notice: Subject to any disclaimer, the term of this patent is extended or adjusted under 35 U.S.C. 154(b) by 185 days.

(21) Appl. No.: 11/285,926

(22) Filed: Nov. 23, 2005

(65) Prior Publication Data

US 2006/0135269 A1 Jun. 22, 2006

Related U.S. Application Data

(63) Continuation-in-part of application No. 11/024,621, filed on Dec. 30, 2004, now abandoned.

(30) Foreign Application Priority Data

Jun. 12, 2004 (CN) .................. 2004 2 0023868

(51) Int. Cl.
*F16D 3/40* (2006.01)
(52) U.S. Cl. .......................... 464/8; 464/136
(58) Field of Classification Search ............. 464/8, 464/132, 136, 903; 384/299, 908
See application file for complete search history.

(56) References Cited

U.S. PATENT DOCUMENTS

| | | | | |
|---|---|---|---|---|
| 887,184 | A * | 5/1908 | Brewer | .................... 464/132 X |
| 3,008,779 | A * | 11/1961 | Spriggs | ...................... 384/299 |
| 3,241,336 | A * | 3/1966 | Nemtsov | ................ 464/132 X |
| 3,300,258 | A * | 1/1967 | Kompanek, Jr. et al. | ........................ 464/136 X |
| 3,662,569 | A | 5/1972 | Williams | |
| 4,512,679 | A * | 4/1985 | Petrzelka et al. | ....... 464/132 X |
| 6,881,151 | B1 | 4/2005 | Jantz et al. | |

FOREIGN PATENT DOCUMENTS

JP 60-95221 A * 5/1985

* cited by examiner

*Primary Examiner*—Greg Binda
(74) *Attorney, Agent, or Firm*—Global IP Services; Tianhua Gu

(57) ABSTRACT

A yoke-trunnion universal joint has a plastic anti-wear coating disposed between the sleeve and trunnion for lubrication, anti wear and absorbing vibration. A combining means combines the plastic anti-wear coating with sleeve or trunnion tightly. The plastic anti-wear coating is made by nylon or polytetrafluoroethylene. The universal joint has a simple structure, long working life, low operating noise and cheap manufacture cost. The most advantage is that the universal joint needs not oil or grease for whole working life. It is an oil or grease free and maintenance free universal joint.

14 Claims, 11 Drawing Sheets

YOKE-TRUNNION UNIVERSAL JOINT WITHOUT NEEDLE BEARINGS

CROSS REFERENCE TO RELATED APPLICATION

This application is a continuation-in-part of U.S. patent application Ser. No. 11/024,621, which was filed on Dec. 30, 2004 and claimed the filing date of Jun. 12, 2004 of the Chinese patent application CN 200420023868.5 as priority date. Now the application Ser. No. 11/024,621 was abandoned.

TECHNICAL FIELD

This invention relates to an improved structure of yoke-trunnion universal joint and, particularly, to an oil or grease free and maintenance free yoke-trunnion universal joint without needle bearings.

BACKGROUND OF THE INVENTION

A conventional yoke-trunnion universal joint has a complicated structure between its trunnion ends and sleeves, leaving a large clearance there between. This, in turn, leads to loose construction and reduced strength. Moreover, needle bearings are rather complicated to manufacture, process and assemble and they easily wear out and run with a loud noise. For example, one kind of universal joint has been applied for patent (Chinese application No.: 87013541) that needs filling with lubricating oil to assure uniform and long-term lubrication at all four roller bearings. To meet these needs, two springs are installed in two vertical passages of the yoke-trunnion. Before installation, the length of the springs is greater than the axial size of the passage. After installation, both ends of each spring contact the inner end surface of the corresponding bearing housing. Such universal joint is quite complicated and the springs lead to a loose structure and high assembly difficulty, tend to wear out, run with loud noise and are hard to seal tightly. Oil leakage often occurs so that the universal joint has a shortened service life and is not economical.

U.S. Pat. No. 6,881,151 teaches a universal joint without needle bearings. Its center cub and rod ends are molded as one integral plastic unit, which make the universal joint weak, can not satisfy the requirements for transmission. Therefore, to date it is not popular in the market.

U.S. Pat. No. 6,881,151 teaches a yoke-trunnion universal joint without needle bearings. There is an anti-wear coating between the inner wall surface of a cup and the trunnion. The wear resistant materials include a material selected from the group consisting of chromium nitride, titanium nitride, titanium carbonitride, zirconium nitride, aluminum titanium nitride, titanium aluminum, zirconium nitride, and aluminum oxide. As the anti-wear coating is consisted of metallic compound, it still needs lubrication. Therefore, the yoke-trunnion universal joint without needle bearings still needs complex lubricant system. Further more, the process of making the metallic compound coating is quite complex. The anti-wear coating is easy to separate from the body. The cost for manufacture is high.

OBJECTS AND SUMMARY OF THE INVENTION

This invention aims to provide a yoke-trunnion universal joint without needle bearings, it need not lubrication, has simple structure, low manufacture cost, long working life, and low noise pollution.

This invention aims at solving the above-mentioned problems of a complicated needle-bearing structure of a yoke-trunnion universal joint between a trunnion and a cup, a loose structure and a large trunnion diameter or a cup diameter caused by the clearance no less than the needle diameter, and reduced strength of whole universal joint.

This invention also avoids the technical problems of prior art such as complicated manufacturing, processing and assembling of the needle bearing, easily wearing out and improper sealing.

This invention also avoids oil leakage in a conventional universal joint so as to prevent the trunnion from early retirement from service. It provides a yoke-trunnion universal joint of easy manufacturing, processing and assembly with smooth running and low noise, particularly at high speed and light load.

This invention solves the above-mentioned problems through the following technical scheme:

A yoke-trunnion universal joint without needle bearing comprising two drive shafts, two yokes with four bosses, four sleeves disposed in the bosses, a cross with 4 trunnions disposed in the sleeves, plastic anti-wear coating disposed between the sleeves and trunnions, a combining means combining the plastic anti-wear coating with the sleeve or trunnion tightly.

The plastic anti-wear coating is made of nylon or polytetrafluoroethylene.

The combining means is that the plastic anti-wear coating is designed as cup shape with an annular flange, the sleeve or trunnion has an annular groove, the annular flange is embedded into the groove tightly to make the plastic anti-wear coating combined with the sleeve or trunnion together.

As the dry frictionfactor between plastic surface and metal surface is about from 0.04 to 0.1, which is much smaller than the frictionfactor between metal surface with metal surface. Therefore, the universal join with plastic anti-wear coating needs not lubrication of oil or grease. The complex lubrication system can be omitted too. The universal joint is free from maintenance.

For an exemplary embodiment, the plastic anti-wear coating is smooth with homogeneous thickness. It is fabricated from a nylon or polytetrafluoroethylene material coating the circumference and end face of the trunnion. The plastic anti-wear coating occupies the annular groove on the trunnion. The plastic anti-coating can be made by plastic spraying method or plastic injection method.

For an exemplary embodiment, the plastic anti-wear coating is smooth with homogeneous thickness. It is fabricated from a nylon or polytetrafluoroethylene material coating the inner wall and bottom of the sleeve. The plastic anti-wear coating is uniformly coated over inner wall, bottom and the annular groove on the sleeve. The plastic anti-coating can be made by plastic spraying method or plastic injection method.

For an exemplary embodiment, the average thickness of the plastic anti-wear coating is 0.10-0.60 mm. Generally, the thickness depends on the coating material strength and other performance characteristics, and also on the size of universal joint, load and rotational speed.

For an exemplary embodiment, an annular groove is designed on the outer wall of the trunnion or inner wall of the sleeve and the plastic anti-wear coating is filled in the groove to become a flange, which make the plastic anti-wear coating more reliable and endurable.

For an exemplary embodiment, coating surface roughness of the trunnion or sleeve Ra is 0.8-3.6 μm, fully utilizing the adhesive force and springiness of the plastic anti-wear coating to directly coat the trunnion or sleeve.

For an exemplary embodiment, annular, helical or meshy bulges are designed on the surface of the plastic anti-wear coating to improve the performance of product.

For an exemplary embodiment, annular, helical or meshy grooves are designed on the surface of the plastic anti-wear coating to improve the performance of product.

Therefore, this invention has the following features: 1. simple structure and easy to manufacture, greatly avoiding the multiple processes or inconvenience brought by manufacturing and assembling needle bearings; 2. a compact structure, reducing the space (clearance) of distributing needle bearings on a traditional trunnion universal joint to several or more millimeters and creating conditions of reducing a diameter of the trunnion or sleeve; 3. avoiding direct contact and abrasion between the needle bearing and the metal surfaces, significantly reducing running noise and making operations smoother; 4. eliminating oil or grease filling and thus eliminating the problem of oil leakage; 5. reducing the hardness requirement for the trunnion or sleeve inner wall and becoming an improved lubricating-free and maintenance-free yoke-trunnion universal joint. The technical scheme of this invention is especially suitable for a high-rate and light-load yoke-trunnion universal joint.

The yoke-trunnion universal joint is use in industries broadly. The amount of products needed by markets is vast. Present invention reduces the manufacture cost significantly. Therefore, a huge economic benefit is created.

DETAILED DESCRIPTION OF THE EXEMPLARY EMBODIMENTS OF THE INVENTION

Figure 1:
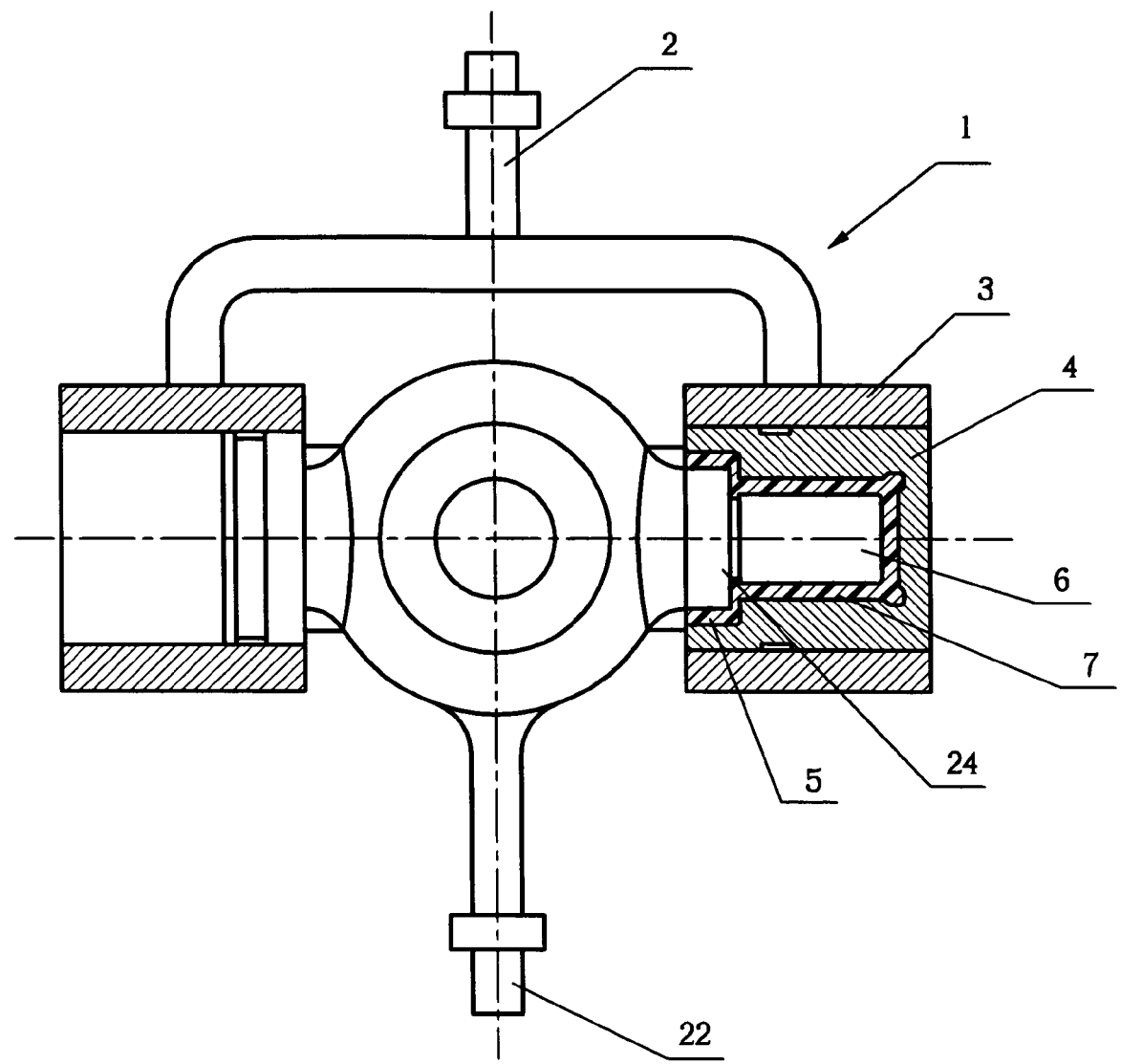
FIG. 1 is a front view of the present invention of yoke-trunnion universal joint without needle bearings, its some parts have cross-section views.

By referring to the drawings, the technical scheme is further described through the exemplary embodiments.

Figure 2:
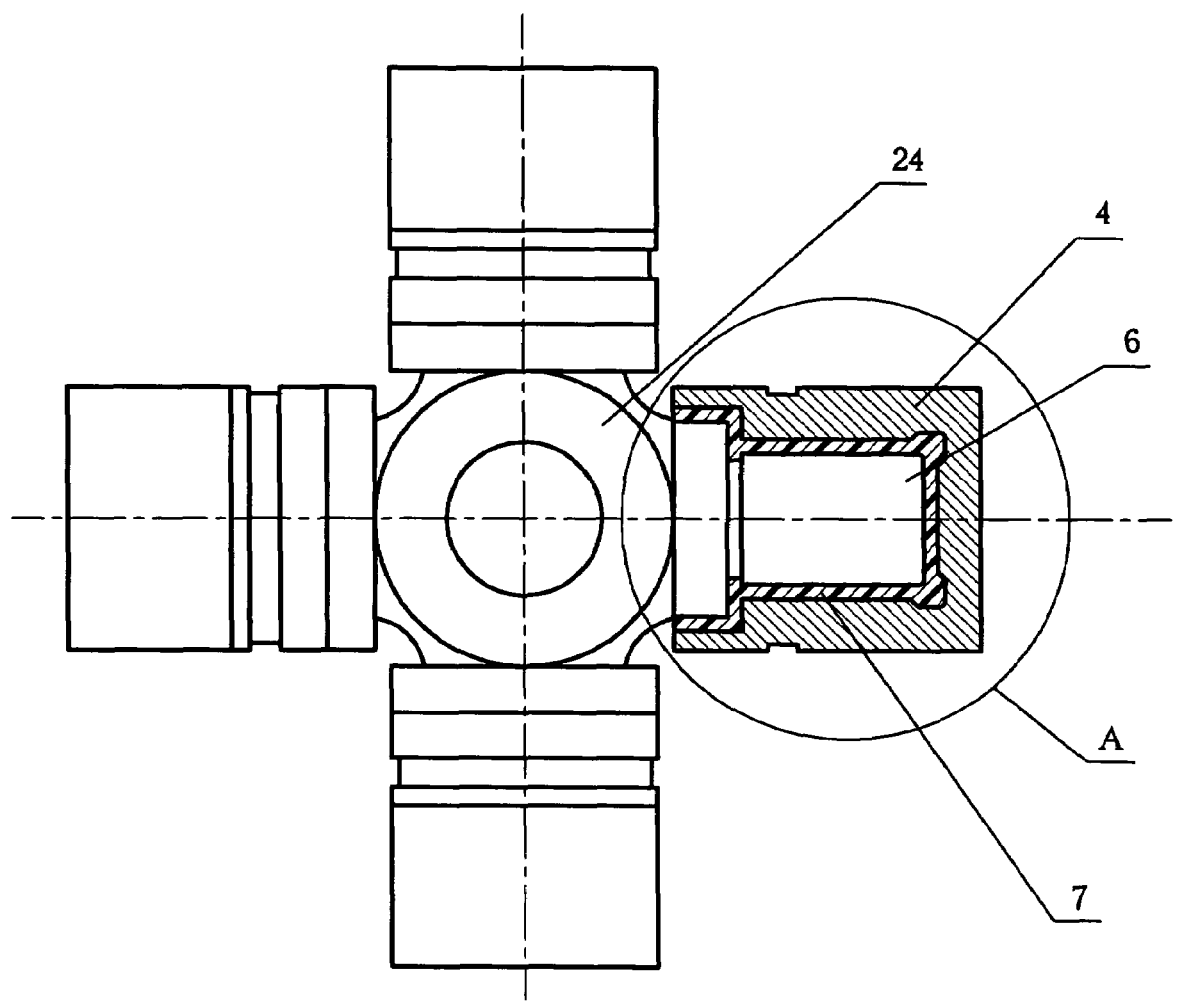
FIG. 2 is a front view for the assembly of the cross and sleeves.
Figure 3:
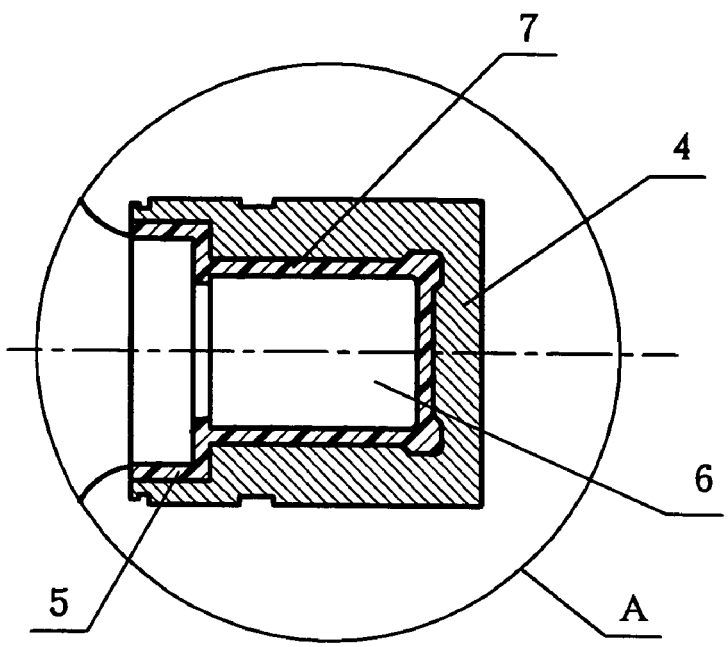
FIG. 3 is an enlarge view for the A part shown on the FIG. 2.

FIGS. 1, 2 and 3 show a yoke-trunnion universal joint without needle bearings 1 formed in accordance with the present invention. The universal joint 1 is constructed as follows: two drive shafts 22 are connected with the two yokes 2 respectively. Yokes 2 have bosses 3. A cross 24 has four trunnions 6. Sleeves 4 receive the trunnions 6, and the sleeves 4 are fixed in the bosses 3. At the ends of sleeves 4 dust seals 5 are disposed there. Plastic anti-wear coating 7 are disposed between trunnions 6 and sleeves 4 to provide functions of lubrication, anti-wearing and absorbing vibration. The universal joint 1 is made by steel, the plastic anti-wear coating 7 is made by nylon or polytetrafluoroethylene (PTFE). The nylon can be PPA nylon. The plastic anti-wear coating 7 is combined with the sleeve 4 or trunnion 6 respectively. In an alternative embodiment the trunnion 6 and sleeve 4 both have the plastic anti-wear coating 7. The plastic anti-coating can be made by plastic spraying method or plastic injection method.

Figure 4:
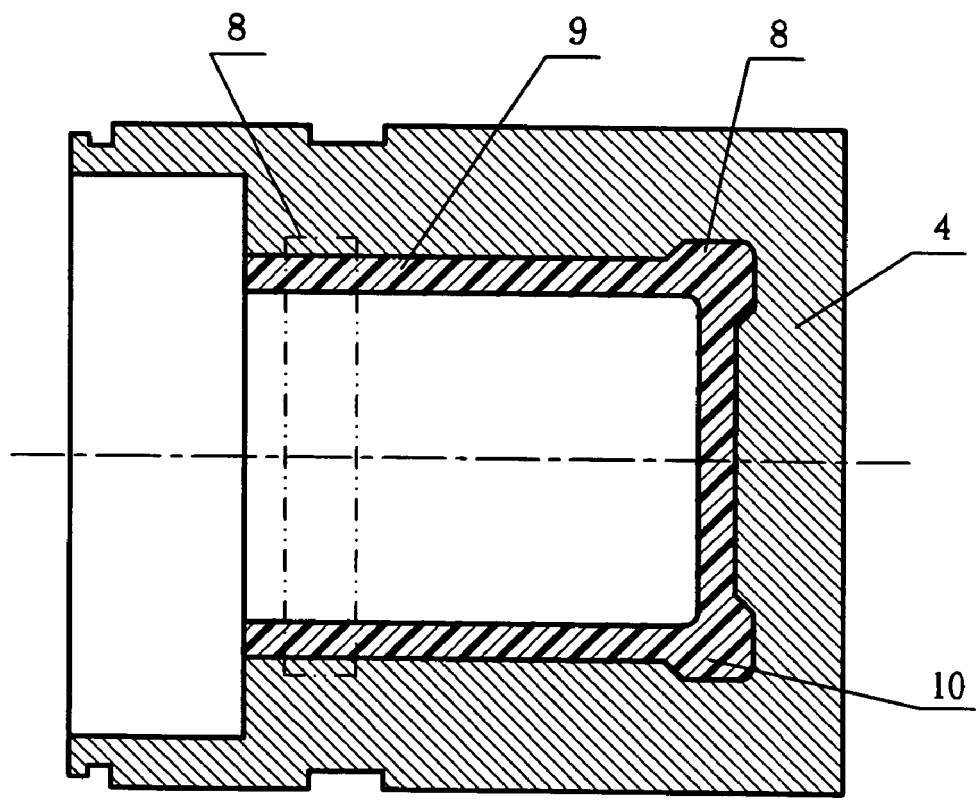
FIG. 4 is a cross-sectional view for the sleeve having plastic anti-wear coating.

FIG. 4 shows the sleeve 4, which is cylinder cup shape having wall and bottom. An annular groove 8 is designed on the inner surface of the sleeve 4, it can be located near bottom or top (shown by phantom line). A plastic anti-wear coating 9 covers on the inner surface including the wall and bottom and occupies the annular groove 8 to become an annular flange 10. The plastic anti-wear coating 9 is a homogeneous thickness layer. The plastic anti-wear coating 9 has a cylinder cup outline with an annular flange 10, which embeds into the groove 8 tightly. The flange 10 and groove 8 tighten the combination of the plastic anti-wear coating 9 with the sleeve 4 together and strengthens the plastic anti-wear coating 9. The inner and bottom surfaces of the sleeve 4 can be made rough with roughness Ra 0.8-3.6 μm for increasing the combination between the plastic anti-wear coating 9 and sleeve 4. The flange 10, groove 8 and that the flange 10 is embedded into the groove 8 make up of a combining means.

The thickness of the plastic anti-wear coating 9 may be 0.10-0.60 mm. The universal joint 1 is made by steel, the plastic anti-wear coating 9 is made by nylon or polytetrafluoroethylene.

Figure 5:
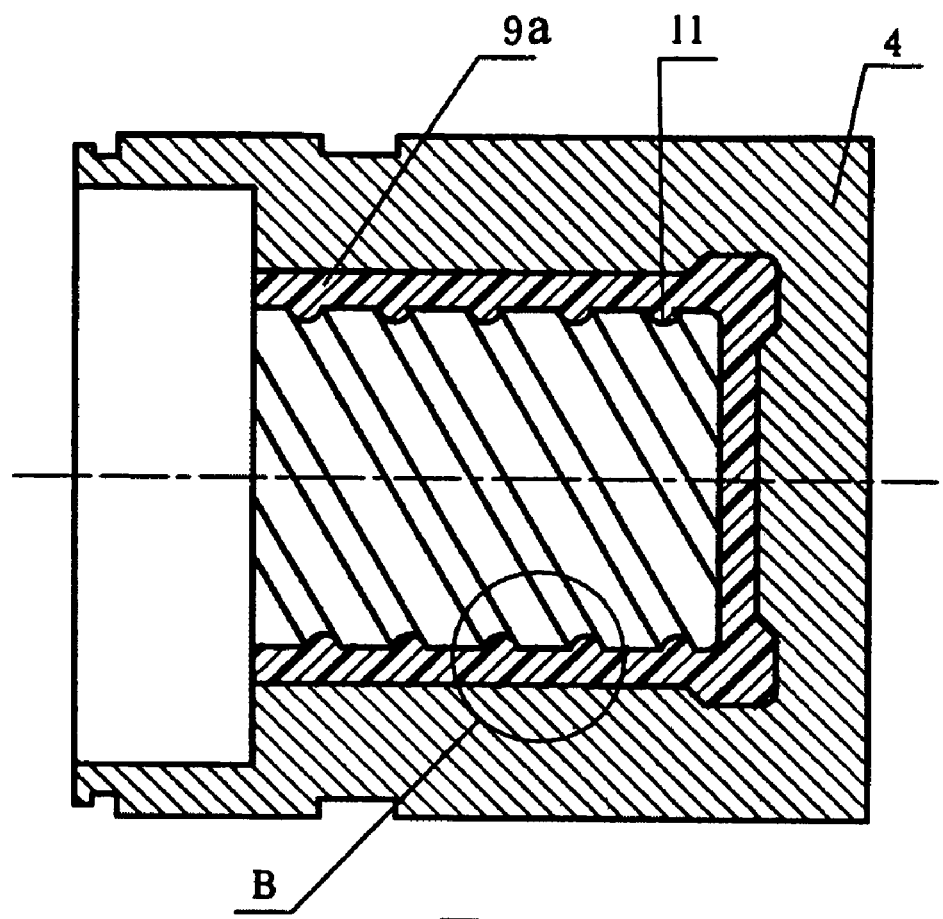
FIGS. 5, 6 and 7 are cross-sectional views of alternative embodiments of the sleeve shown on FIG.4.
Figure 5A:
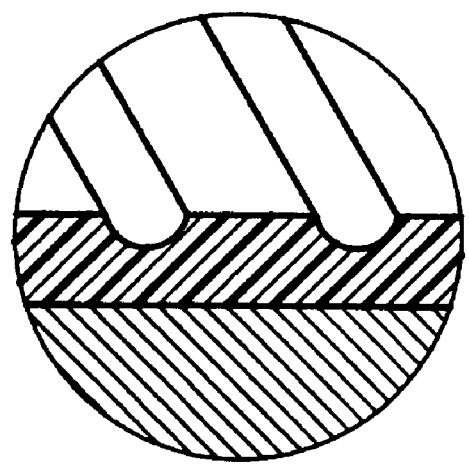
FIGS. 5A, 6A, 7A are enlarge views for the B, C, D parts shown on the FIGS. 5, 6, 7.
Figure 6:
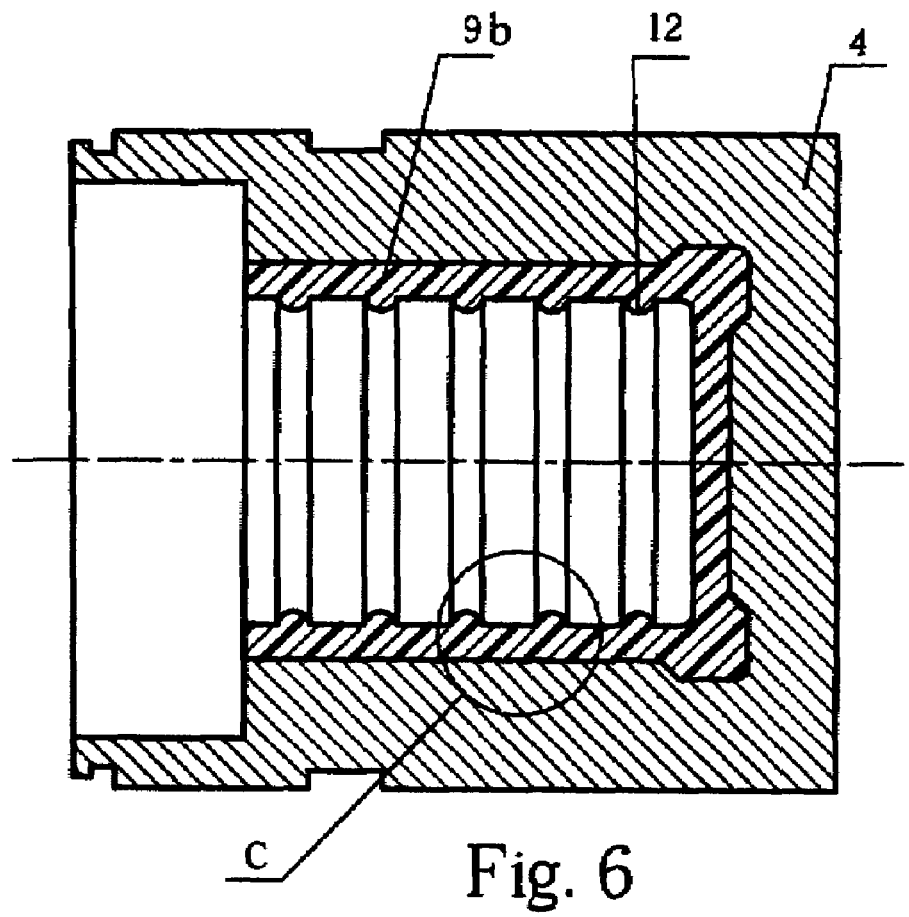
Figure 6A:
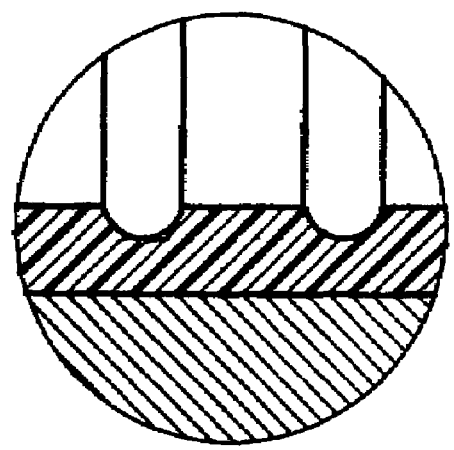
Figure 7:
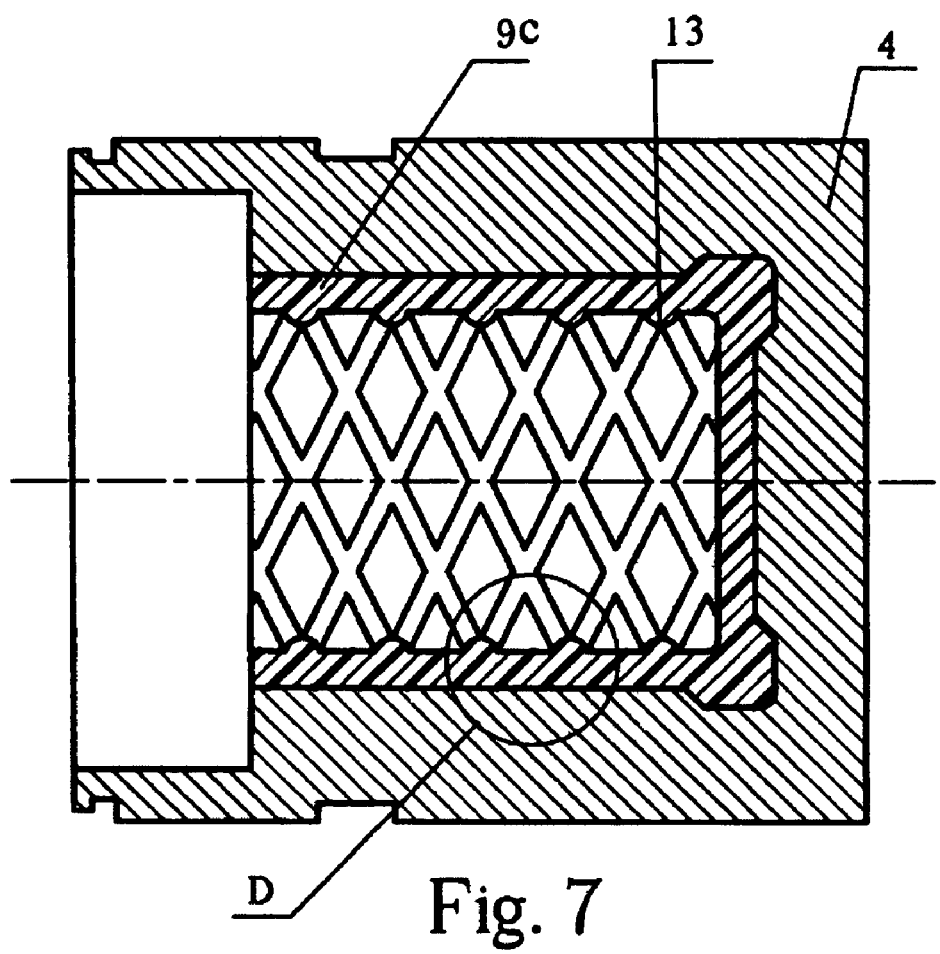
Figure 7A:
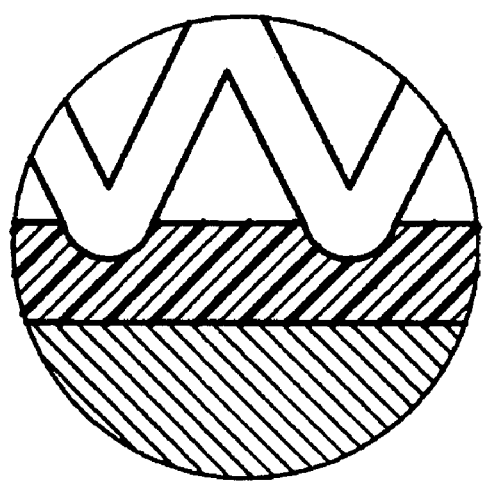

FIGS. 5, 6, 7 show the plastic anti-wear coating 9a, 9b, 9c having bulges for changing the touching face as dots or lines to reduce frication friction, noise and absorbing vibration. The bulge is annular bulge 12 or helical bulge 11 or meshy bulge 13. For the same reason, we can use an annular groove (FIG. 6A), helical groove (FIG. 5A) and meshy groove (FIG. 7A) to replace the annular bulge, helical bulge and meshy bulge.

Figure 8:
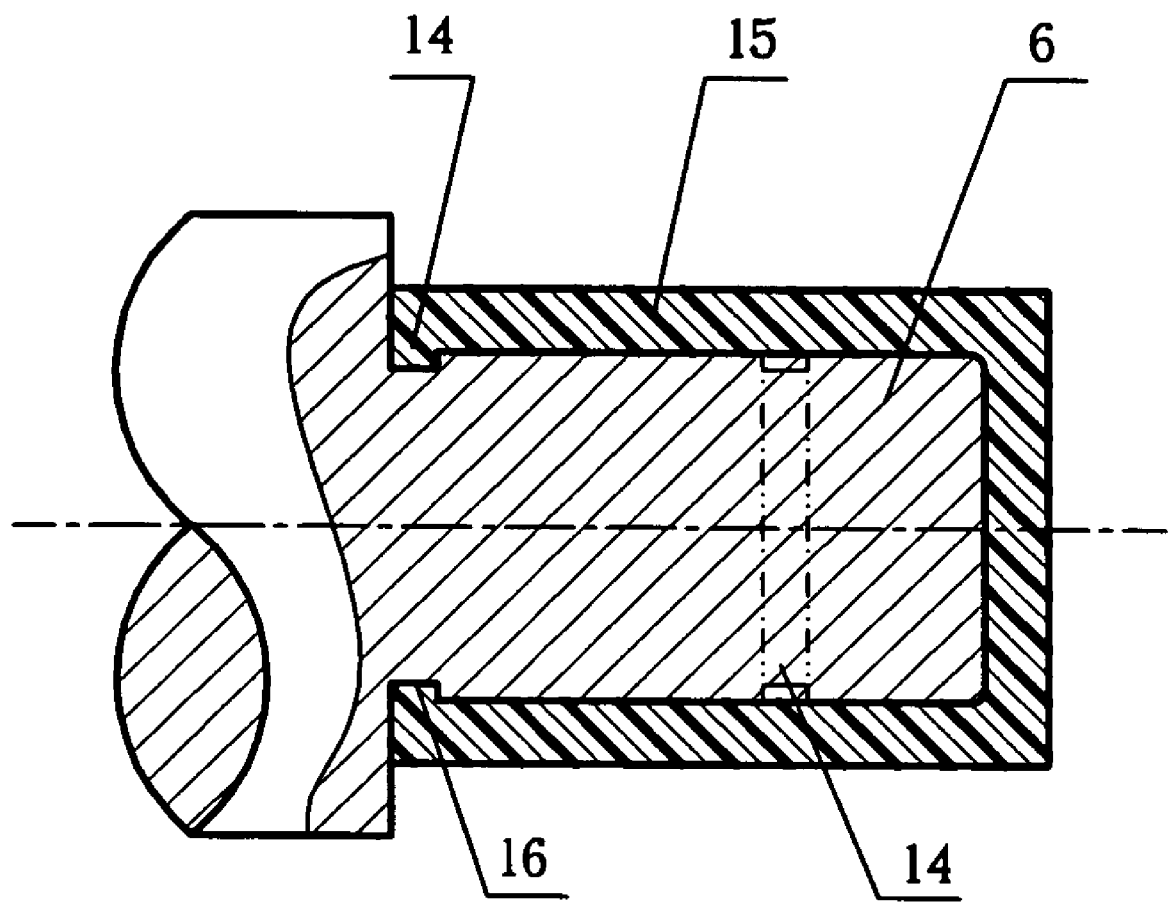
FIG. 8 is a cross section view of the trunnion having plastic anti-wear coating.

FIG. 8 shows the trunnion 6, which is cylinder shape having outer wall and top. An annular groove 14 is designed on the outer wall of the trunnion 6, it can be located near bottom or top (shown by phantom line in FIG. 8). A plastic anti-wear coating 15 covers on the outer wall and top, and occupies the annular groove 14 to become an annular flange 16. The plastic anti-wear coating 15 is a homogeneous thickness layer. The plastic anti-wear 15 has a cylinder cup outline with an annular flange 16, which embeds into the groove 14 tightly. The groove 14 and flange 16 tightens the combination of the plastic anti-wear coating 15 with the trunnion 6 together and strengthens the plastic anti-wear coating 15. The outer wall and top of the trunnion 6 can be made rough with roughness Ra 0.8-3.6 μm for increasing the combination between the plastic anti-wear coating 15 and trunnion 6. The flange 16, groove 14 and the flange 16 embedding into groove 14 make up of a combining means. The thickness of the plastic anti-wear coating may be 0.10-0.60 mm.

Figure 9:
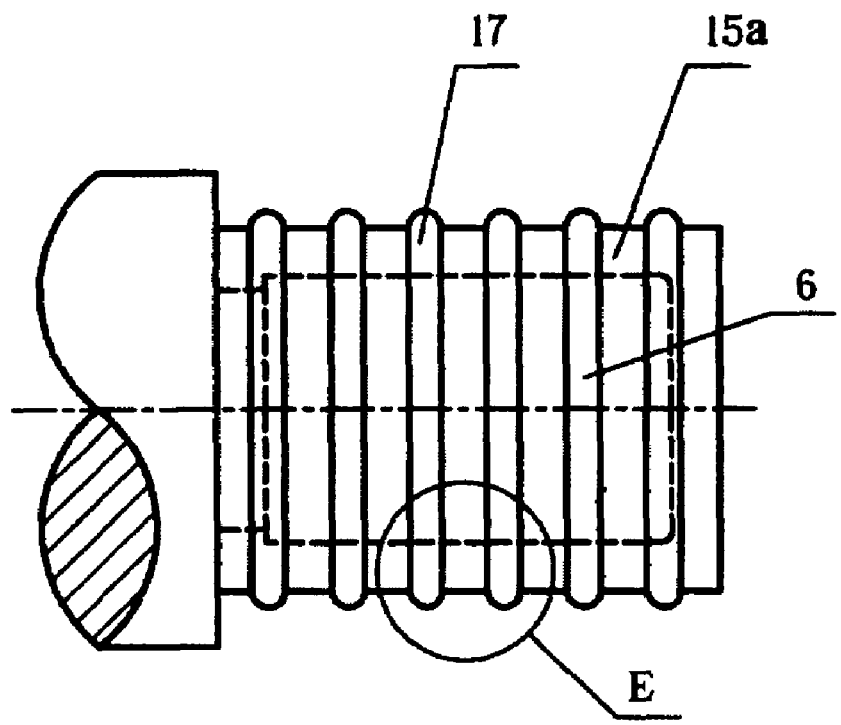
FIGS. 9, 10, 11 are cross section views of alternative embodiments of the trunnion shown on FIG. 8.
Figure 9A:
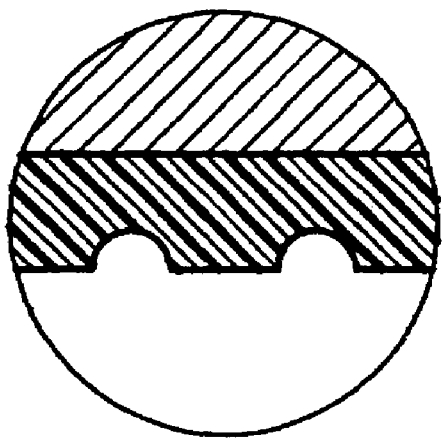
FIGS. 9A, 10A, 11A are cross section views of the E, F, G parts shown on FIGS. 9, 10,11.
Figure 10:
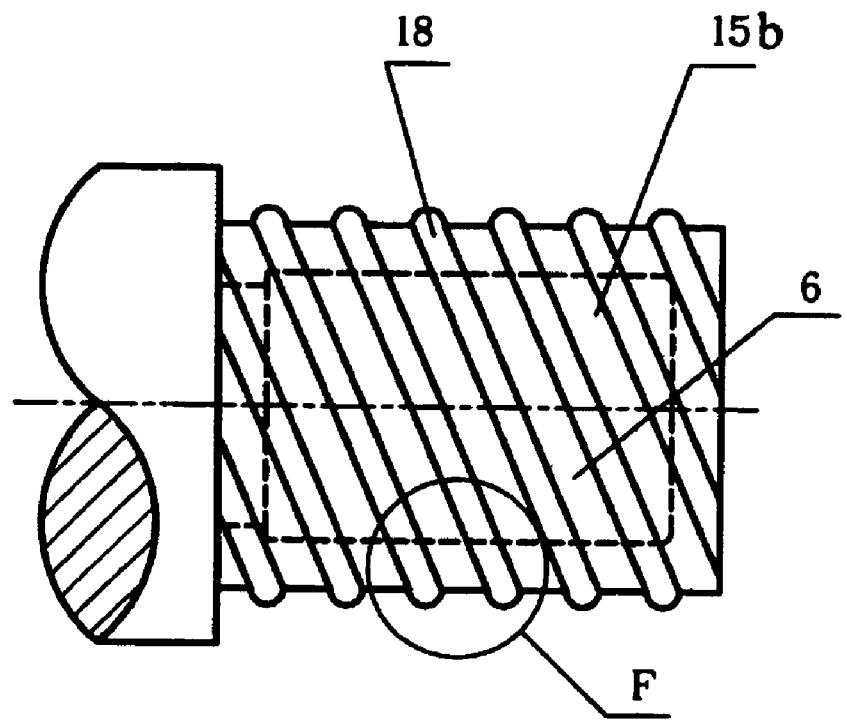
Figure 10A:
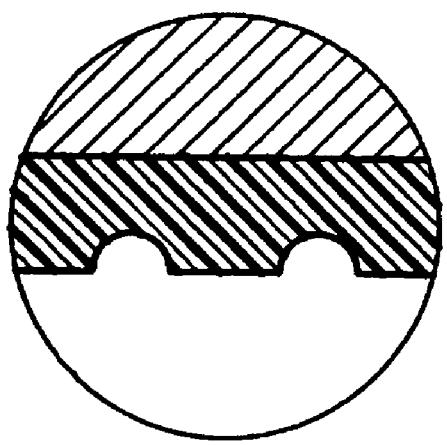
Figure 11:
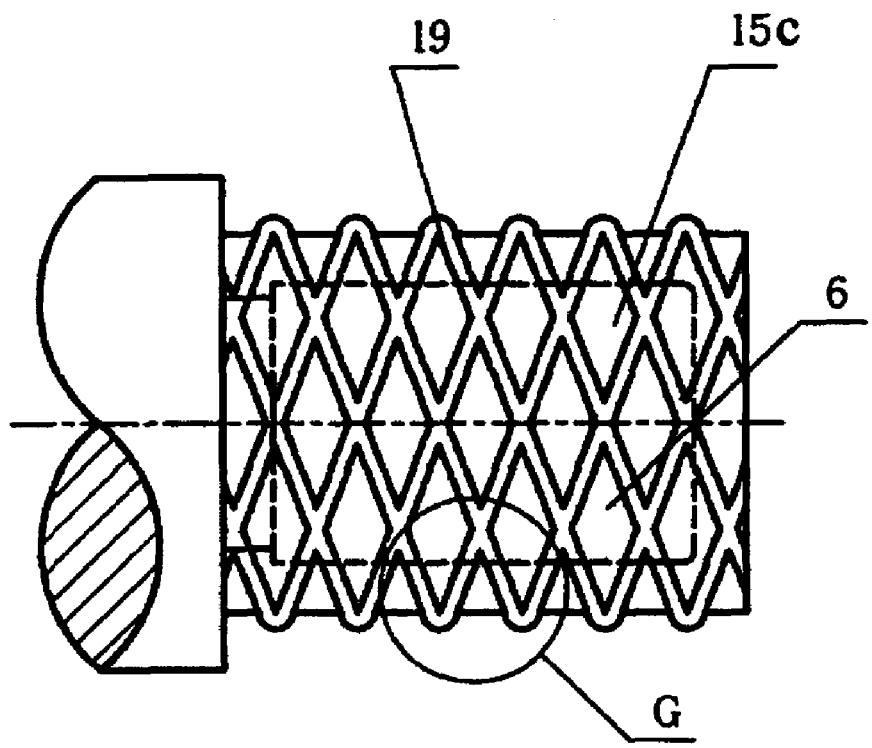
Figure 11A:
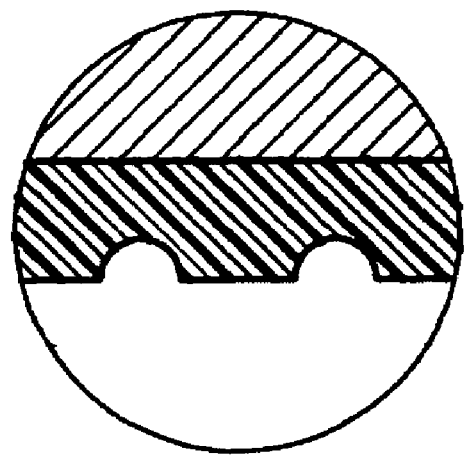
Figure 12:
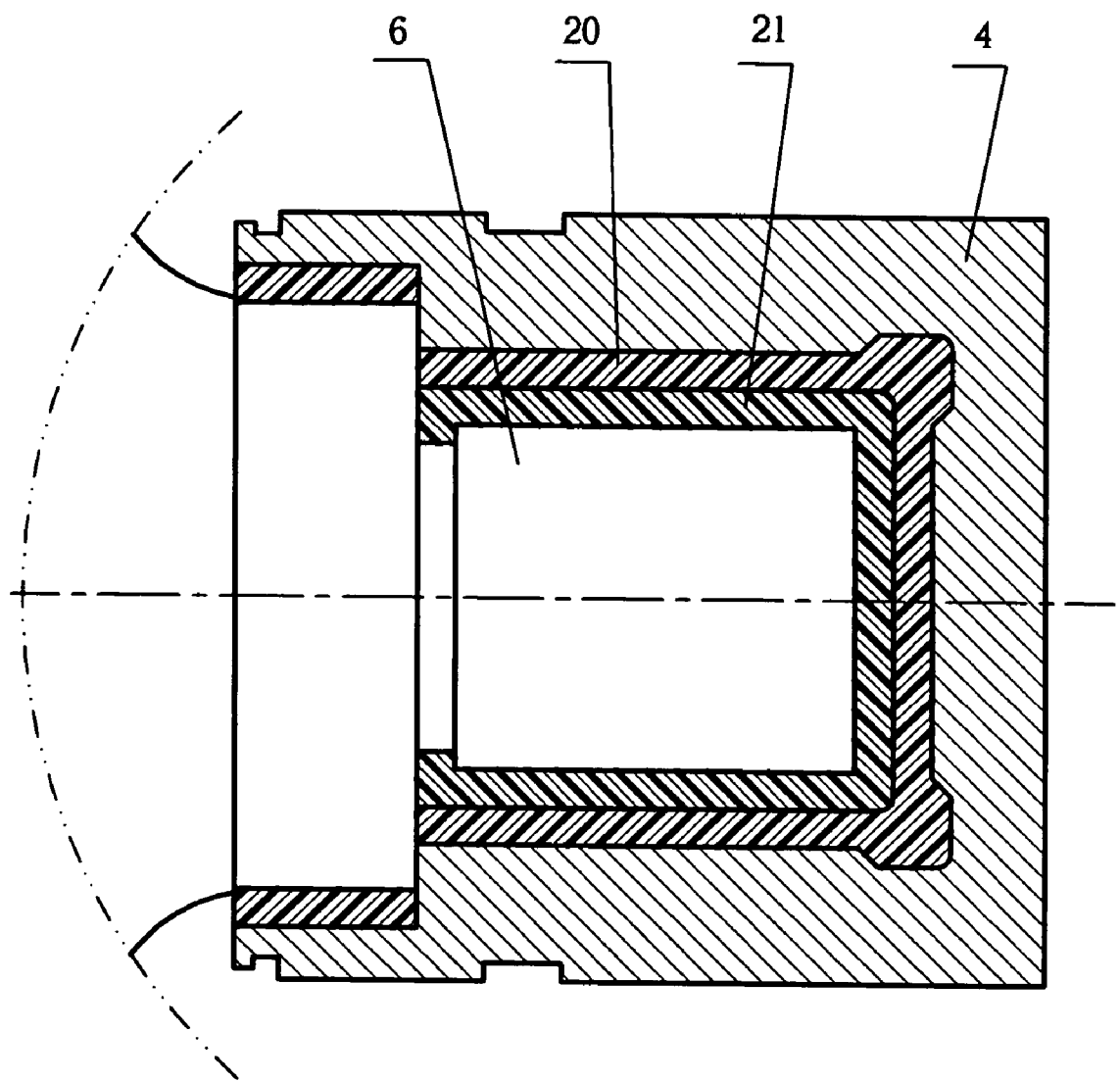
FIG. 12 is a cross section view of the assembly of the trunnion and sleeve, the trunnion and sleeve both have plastic anti-wear coating.

The universal joint 1 is made by steel, the plastic anti-wear coating 15 is made by nylon or polytetrafluoroethylene. FIGS. 9, 10, 11 show the plastic anti-wear coatings 15a, 15b, 15c having bulges for changing the touching face as dots or lines to reduce frication, noise and absorbing vibration. The bulge is annular bulge 17 or helical bulge 18 or meshy bulge 19. For the same reason, an annular groove (FIG. 9A), helical groove (FIG. 10A) and meshy groove (FIG. 11A) can replace the annular bulge, helical bulge and meshy bulge FIG. 12 shows an assembly of sleeve 4 and trunnion 6, in which the sleeve 4 and trunnion 6 both have plastic anti-wear coating 20 and 21. The plastic anti-wear coating 20 is the same as the plastic anti-wear coating 9 including its alternative embodiments. The plastic anti-wear coating 21 is the same as the plastic anti-wear coating 15 including its alternative embodiments.

It will be appreciate that various changes can be made therein without departing from the spirit and scope of the invention.

What is claimed is:

1. A yoke-trunnion universal joint, consisting of:
drive shafts, yokes with bosses connected with said drive shafts; sleeves fixed in said bosses, said sleeves having cylinder cup shape;
a cross having four trunnions, said trunnions being disposed in said sleeves;
plastic anti-wear coatings disposed between said sleeves and said trunnions for lubrication, anti wear and absorbing vibration;
said plastic anti-wear coating covering the inner surface and inner bottom of said sleeve becoming a cylinder cup shape;
a combining means for combining said plastic anti-wear coatings with said sleeves or said trunnions tightly;
said combining means consisting of a radial flange extended outward from the bottom of said plastic anti-wear coating with a cylinder cup shape and a radial groove at the inner bottom of said sleeve, said radial flange embedding into said radial groove, thereby said plastic anti-wear coating with cylinder cup shape connecting with said sleeve with cylinder cup shape tightly.

2. The yoke-trunnion universal joint of claim 1, wherein said combining means is to increase the roughness of said inner surface and inner bottom of said sleeve to Ra 0.8-3.6 μm.

3. The yoke-trunnion universal joint of claim 1, wherein said plastic anti-wear coating has bulges for reducing friction, noise and absorbing vibration, said bulges are annular bulges or helical bulges or meshy bulges.

4. The yoke-trunnion universal joint of claim 1, wherein said plastic anti-wear coating has grooves for reducing frication, noise and absorbing vibration, said grooves are annular grooves or helical groove or meshy grooves.

5. The yoke-trunnion universal joint of claim 1, wherein said plastic anti-wear coating is homogeneous with 0.1 to 0.60 mm thickness.

6. The yoke-trunnion universal joint of claim 1, wherein said plastic anti-wear coating is made by nylon or polytetrafluoroethylene.

7. The yoke-trunnion universal joint of claim 1, wherein said plastic anti-wear coating covers the outer surface and top of said trunnion becoming a cylinder cup shape, a radial flange extended inward from the top of the plastic anti-wear coating with cylinder cup shape and a radial groove at the bottom of said trunnion, said radial flange embeds into said radial groove, thereby said plastic anti-wear coating with cylinder cup shape connecting with said trunnion tightly.

8. The yoke-trunnion universal joint of claim 7, wherein said combining means is to increase the roughness of said outer surface and top of said trunnion to Ra 0.8-3.6 μm.

9. The yoke-trunnion universal joint of claim 7, wherein said plastic anti-wear coating has bulges for reducing friction, noise and absorbing vibration, said bulges are annular bulges or helical bulges or meshy bulges.

10. The yoke-trunnion universal joint of claim 7, wherein said plastic anti-wear coating has a groove for reducing friction, noise and absorbing vibration, said groove are annular groove or helical groove or meshy groove.

11. The yoke-trunnion universal joint of claim 7, wherein said plastic anti-wear coating is homogeneous with 0.1 to 0.60 mm thickness.

12. The yoke-trunnion universal joint of claim 7, wherein said plastic anti-wear coating is made by nylon or polytetrafluoroethylene.

13. The yoke-trunnion universal joint of claim 1, wherein said sleeve and said trunnion both have a plastic anti-wear coating.

14. The yoke-trunnion universal joint of claim 1, wherein all its parts are made of metal except said plastic anti-wear coating.

* * * * *